United States Patent
Chu et al.

(10) Patent No.: US 7,652,084 B2
(45) Date of Patent: Jan. 26, 2010

(54) NANOCOMPOSITE FIBERS AND FILM CONTAINING POLYOLEFIN AND SURFACE-MODIFIED CARBON NANOTUBES

(75) Inventors: Benjamin Chu, Setauket, NY (US); Benjamin S. Hsiao, Setauket, NY (US)

(73) Assignee: The Reseach Foundation of State University of New York, Albany, NY (US)

( * ) Notice: Subject to any disclaimer, the term of this patent is extended or adjusted under 35 U.S.C. 154(b) by 524 days.

(21) Appl. No.: 10/570,553

(22) PCT Filed: Sep. 3, 2004

(86) PCT No.: PCT/US2004/025767

§ 371 (c)(1),
(2), (4) Date: Mar. 3, 2006

(87) PCT Pub. No.: WO2005/084167

PCT Pub. Date: Sep. 15, 2005

(65) Prior Publication Data

US 2008/0275177 A1 Nov. 6, 2008

Related U.S. Application Data

(60) Provisional application No. 60/500,812, filed on Sep. 5, 2003.

(51) Int. Cl.
*C08K 5/00* (2006.01)
*B32B 27/32* (2006.01)
*C09K 11/02* (2006.01)

(52) U.S. Cl. .................. 524/236; 428/398; 252/301.35
(58) Field of Classification Search .............. 524/236; 428/398; 252/301.35
See application file for complete search history.

(56) References Cited

U.S. PATENT DOCUMENTS

| 6,187,823 | B1 | 2/2001 | Haddon et al. |
| 6,331,265 | B1* | 12/2001 | Dupire et al. ............ 264/289.3 |
| 6,531,513 | B2* | 3/2003 | Haddon et al. ................ 516/32 |
| 2001/0016608 | A1 | 8/2001 | Haddon et al. |
| 2002/0161096 | A1* | 10/2002 | Loontjens et al. ........... 524/445 |
| 2002/0197474 | A1 | 12/2002 | Reynolds |
| 2003/0001141 | A1* | 1/2003 | Sun et al. ............... 252/301.35 |
| 2004/0262581 | A1* | 12/2004 | Rodrigues .................. 252/500 |

FOREIGN PATENT DOCUMENTS

| KR | 20030005710 | * 7/2001 |
| KR | 2003005710 | 1/2003 |
| WO | WO 02/060812 | 8/2002 |

OTHER PUBLICATIONS

Wu W., PVK-Modified Single-Walled Carbon Nanotubes with Effective Photoinduced Electron Transfer, Macromolecules 2003, 36, 6286-6288.*
Ruan, et al., Toughening High Performance Ultrahigh Molecular Weight Polyethylene Using Multiwalled Carbon Nanotubes, Polymer 44 (2003), 5643-5654.*
Translation of KR 20030005710, Jul. 2001.*
Ran, et al., "In-Situ Synchrotron SAXS/WAXD of Melt Spinning of Modified Carbon Nanofiber and Polypropylene Nanocomposite", *ACS PMSE*, vol. 89, pp. 735-736 (2003).
Hu, et al., "Determination of the acidic sites of purified single-walled carbon nanotubes by acid-base titration", *Chemical Physics Letters* vol. 345, pp. 25-28 (2001).
Dalton, et al. "Super-tough Carbon-nanotube fibres", *Nature* vol. 423 p. 703 (2003).
Ran, et al., "Mesophase as the Precursor for Strain-Induced Crystallization in Amorphous Poly(ethylene terephthalate) Film", *Macromolecules*, vol. 35, pp. 10102-10107 (2002).
Chu, et al. "Small-Angle X-ray Scattering of Polymers", *Chem. Rev.*, vol. 101, pp. 1727-1761 (2001).
Qin, et al., "Large-Scale Preparation of Solubilized Carbon Nanotubes", *Chem. Mater.* vol. 15, pp. 3256-3260 (2003).
Frankland, et al., "Molecular Simulation of the Influence of Chemical Cross-Links on the Shear Strength of Carbon Nanotube-Polymer Interfaces", *J. Phys. Chem. B* vol. 106, pp. 3046-3048 (2002).
Bratcher, et al., "Study in the Dispersion of Carbon Nanotubes", *Mat. Res. Soc. Symp. Proc.*, vol. 706, pp. 1-6 (2002).
Andreas Hirsch, "Functionalization of Single-Walled Carbon Nanotubes", *Angew. Chem. Int. Ed.*, vol. 41, No. 11, pp. 1853-1859 (2002).
International Search Report issued in corresponding European Application No. EP 04 82 1721 dated Feb. 11, 2009.

* cited by examiner

*Primary Examiner*—Ling-Siu Choi
*Assistant Examiner*—Hui Chin
(74) *Attorney, Agent, or Firm*—Carter, DeLuca, Farrell & Schmidt, LLP

(57) ABSTRACT

Methods for modifying carbon nanotubes with organic compounds are disclosed. The modified carbon nanotubes have enhanced compatibility with polyolefins. Nanocomposites of the organo-modified carbon nanotubes and polyolefins can be used to produce both fibers and films having enhanced mechanical and electrical properties, especially the elongation-to-break ratio and the toughness of the fibers and/or films.

19 Claims, 12 Drawing Sheets

(A)

(B)

NANOCOMPOSITE FIBERS AND FILM CONTAINING POLYOLEFIN AND SURFACE-MODIFIED CARBON NANOTUBES

CROSS-REFERENCE TO RELATED APPLICATIONS

This application claims the benefit of U.S. Provisional Patent Application No. 60/500,812 filed Sep. 5, 2003, the contents of which are incorporated by reference herein.

GOVERNMENT RIGHTS

This invention was made with Government support under U.S. Army Research Office Grant DAAD190010419, Department of Energy Grants DEFG0286ER45237.022 and DEFG0299ER45760, the Office of Naval Research Grant N000140310932 and NSF Grants DMR9984102 and DMR0098104. The Government has certain rights in the invention.

BACKGROUND

Methods and techniques for enhancing the physical and/or mechanical properties of polyolefins are known. For example, the development of high performance ultra-high molecular weight polyethylene (UHMWPE) films and fibers has been well established, which can be achieved by using a range of unique processing techniques to avoid the generation of high entanglement density in the final products. Such techniques include film drawing and fiber spinning in the gel state. However, one drawback to some of these methods is they require a large amount of solvent. If processed by conventional melt-processing techniques with the aid or solvent, UHMWPE chains usually produce an extraordinarily high entanglement density, resulting in very low draw ability or brittleness in the final product.

Carbon nanotubes, including single-wall nanotube (SWNT), multi-wall nanotube (MWNT) and carbon nanofibers (CNFs), have recently received a great deal of attention in the polymer community. Efforts have been undertaken to develop super-tough composite materials based on carbon nanotubes and polymer matrices. For example, one study has demonstrated the super-tough performance of polyvinyl alcohol (PVA)/single wall carbon nanotube (SWNT) nanocomposite fibers. Dalton et al., "Super-tough Carbon-Nanotube Fibres" Nature (2003), Vol. 423, p. 703.

These nanostructured materials have been recognized for their superior mechanical strength, excellent thermal conductivity and electrical conductivity and may be utilized to improve the properties of various polymers.

Carbon nanofibers are potentially useful in reinforced composites, as supports for catalysts in high temperature reactions, heat management, reinforcement of elastomers, filters for liquids and gases, and as a component of protective clothing. Nanofibers of carbon or polymers are likely to find applications in reinforced composites, substrates for enzymes and catalysts, applying pesticides to plants, textiles with improved comfort and protection, advanced filters for aerosols or particles with nanometer scale dimensions, aerospace thermal management application, and sensors with fast response times to changes in temperature and chemical environment.

In the case of mechanical enhancement, all published work on polymeric nanocomposites containing carbon nanotubes indicate that the improvement is only incremental; substantially below the expectation of the super-tough performance of polyvinyl alcohol (PVA)/SWNT nanocomposite fibers demonstrated by Dalton et al. described above.

Nanofibers having enhanced mechanical and electrical characteristics, including enhanced strength and fire retardant capabilities, thus remain desirable, as are composites including such nanofibers.

SUMMARY

In accordance with the present disclosure, unique synthetic techniques have been developed for the modification of carbon nanotubes where aliphatic linkers of tailored length are covalently bonded to the carbon nanotube surface. The surface modification process and consequent compounding can be implemented using standard melt mixing or solution mixing equipment and results in modified carbon nanotubes with enhanced compatibility with polyolefins. Nanocomposites of these modified carbon nanotubes and a polyolefin matrix can be formed and utilized in the design, development and creation of new fibers and films.

DETAILED DESCRIPTION

Figure 1:
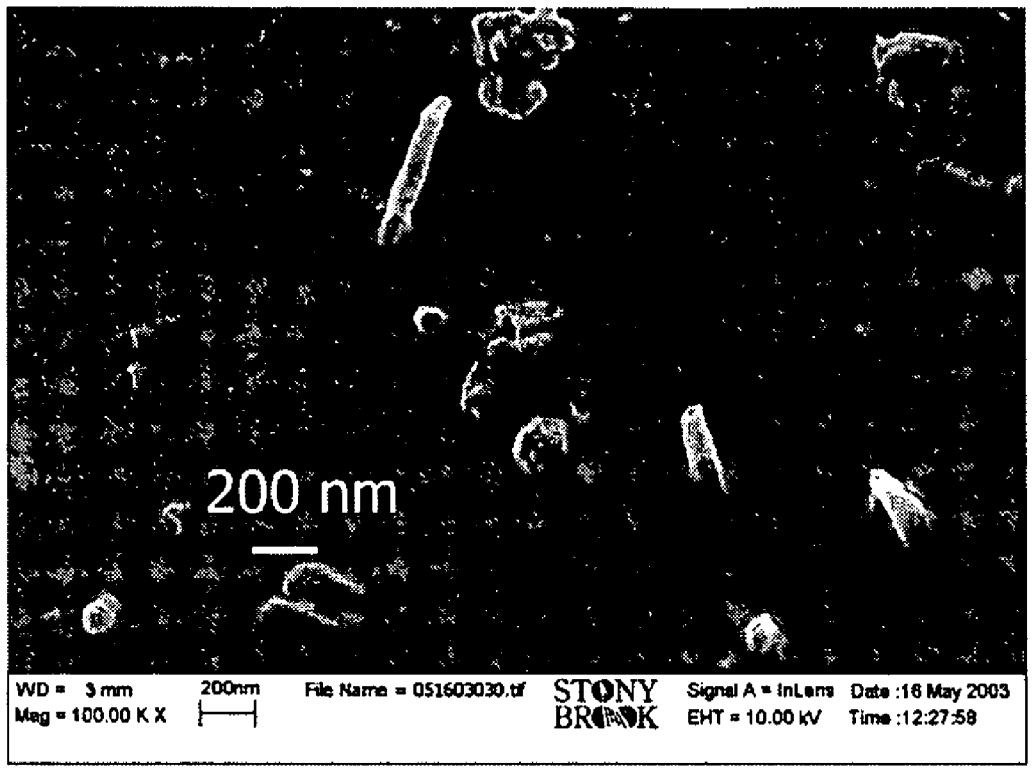
FIG. 1 is a scanning electron microscope image of the cross-section of a nanocomposite fiber produced in accordance with the present disclosure.

In accordance with the present disclosure, carbon nanotubes may be functionalized by reacting them with aliphatic linkers (sometimes referred to herein as "modifiers") to enhance their compatibility with polyolefins. The resulting modified carbon nanotubes, especially carbon nanofibers (sometimes referred to herein as MCNF), modified single-wall nanotubes (MSWNTs), and modified multi-wall carbon nanotubes (MMWNTs) have enhanced compatibility with polyolefins and the combination of carbon nanotube and polyolefin can be used to produce fibers and films having enhanced mechanical and electrical properties.

Suitable carbon nanotubes for use in accordance with the present disclosure include single wall nanotubes (SWNT), multi-wall nanotubes (MWNT) and carbon nanofibers (CNF), all of which are known to those skilled in the art. In one embodiment the carbon nanotube may be a CNF. CNFs can be mass-produced by the vapor growth method, and can be cheaper than SWNTs or MWNTs. CNFs have an exceedingly high anisotropic shape, with an average diameter of 50~200 nm, bridging the gap between the size of conventional carbon fibers (7~10 μm) and those of SWNTs (a few nanometers) and MWNTs (a few tens of nanometers). CNFS are commercially available from numerous sources including, e.g., Pyrograf Products, Inc. (Cedarville, Ohio).

In one embodiment, to enhance the modification of the carbon nanofibers, SWNTs or MWNTs, surface acidic groups (carboxylic acid and hydroxyl) are generated on the carbon nanotubes by an oxidation reaction with a strong acid. Suitable strong acids for use in generating surface acidic groups include, but are not limited to, potassium chlorate, potassium perchlorate, sulfuric acid, hydrochloric acid, and combinations and mixtures thereof. The nanofibers are subjected to this acid treatment at a temperature ranging from about 0° C. to about 100° C., with a temperature of about 20° C. to about 60° C. being preferred. This oxidation step generates carboxylic acid (—COOH) or sulfonic acid (—OSO$_3$OH) moieties at the CNF's or MWNT's sidewall to form an oxidized-CNF or oxidized-MWNT.

In one embodiment, a potassium chlorate/sulfuric acid solution may be utilized to generate surface acidic groups on the carbon nanotube, such as a CNF. Where desired, the amount of carboxylic acid groups on the surface of the oxidized-CNF can be determined by methods known to those skilled in the art, including by titration using NaHCO$_3$ solution.

Once the surface acid groups have been generated on the CNF, in some embodiments a polymerization initiator can be added and attached to the CNF. Suitable polymerization initiators are known to those skilled in the art and include, but are not limited to, 1-(Benzyloxy)-2-phenyl-2-(2',2',6',6'-tetramethyl-1'-piperidinyloxy)ethane (TEMPO-ester), and 1-Hydroxy-2-phenyl-2-(2',2',6',6'-tetramethyl-1'-piperidinyloxy) ethane (TEMPO-alcohol).

In some embodiments, conventional catalysts, such as triethylamine (TEA), may also be added at a temperature ranging from about 20° C. to about 90° C., preferably from about 70° C. to about 80° C., for a period time ranging from about 1 hour to about 5 days, more preferably from about 1 day to about 3 days.

The reaction mixture can then be washed, preferably with water, tetrahydrofuran (THF), or mixtures thereof, and dried in vacuo at a suitable temperature, preferably ranging from about 20° C. to about 90° C., more preferably from about 65° C. to about 75° C.

The resulting initiator-attached CNFs may then be allowed to polymerize with a modifier, i.e., a linker whose chemical composition is compatible with the polyolefin component in the nanocomposite, e.g., an aliphatic hydrocarbon linker for polyolefin, to produce a modified CNF (MCNF). An alkene, preferably a vinyl based alkene such as isoprene, butadiene, isobutadiene, or mixtures thereof, may be utilized as a modifier and mixed with the initiator-attached CNFs at a mole ratio of initiator to modifier ranging from about 0.5:600, more preferably from about 1:480. The mixture may be heated to a temperature ranging from about 90° C. to about 180° C., preferably from about 110° C. to about 150° C., for a period of time ranging from about 5 hours to about 15 hours, more preferably from about 8 hours to about 12 hours. After the polymerization, the resulting grafted CNFs may be washed with methanol and dried in vacuo at a suitable temperature, preferably ranging from about 50° C. to about 100° C., more preferably from about 65° C. to about 75° C.

The MCNFs, also referred to as grafted CNFs, can then be introduced into a suitable solvent such as xylene. Crosslinkers known to those skilled in the art, such as p-toluenesulfonyl hydrazide, tri-n-propyl amine, and combinations thereof, may be added to the solution mixture containing the grafted CNFs. The mixture may be heated to reflux at a temperature ranging from about 100° C. to about 180° C., more preferably from about 120° C. to about 160° C. for a period of time ranging from about 2 to about 6 hours, more preferably from about 3 to about 5 hours. The solution may then be filtered, washed with deionized water and methanol, and dried in vacuo at a temperature ranging from about 70° C. to about 110° C., more preferably from about 80° C. to about 100° C.

The above modification scheme of the carbon nanofibers to produce the MCNFs may thus be summarized as follows:

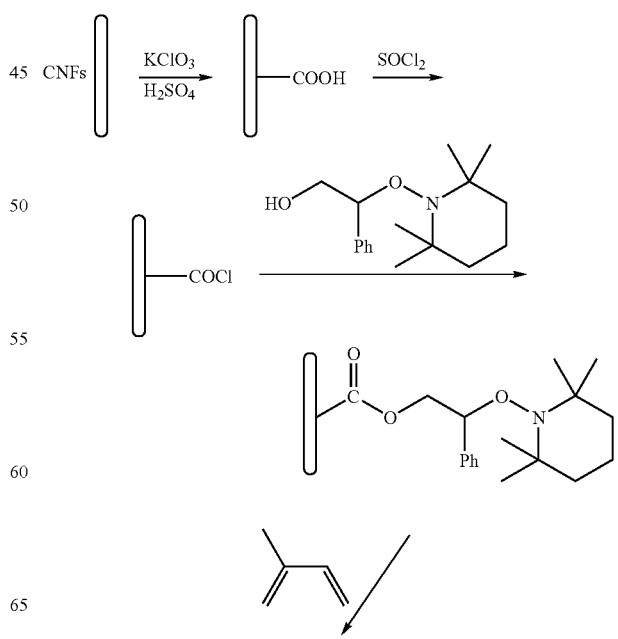

-continued

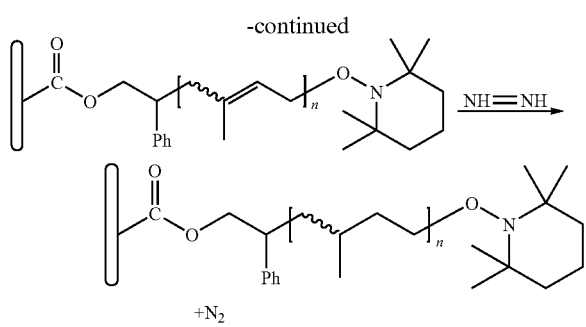

In another embodiment, MCNFs of the present disclosure may be prepared by generating surface acidic groups (carboxylic acid and hydroxyl) on the carbon nanofibers (CNFs) as described above. The same strong acids described above may be used to generate surface acidic groups including, but not limited to, potassium chlorate, potassium perchlorate, sulfuric acid, hydrochloric acid, and combinations and mixtures thereof, thus producing an oxidized-CNF as described above. In one embodiment, a potassium chlorate/sulfuric acid solution may be utilized to generate surface acidic groups on the carbon nanofiber.

The oxidized-CNFs may then be dispersed in a modifier, i.e., a linker with chemical compositions compatible with the polyolefin component of the nanocomposite. For UHMWPE, the aliphatic linker could include an amine, such as octyl amine, decyl amine, dodecyl amine, hexadecyl amine, octadecylamine, or an amine terminated branched hydrocarbon chain that can orient the attached hydrocarbons parallel to the long axis of the carbon nanofibers or carbon nanotubes. Mixtures and/or combinations of the foregoing amines may also be utilized in some embodiments. In one embodiment, the oxidized-CNFs may be dispersed in octadecylamine.

In a particularly useful embodiment, the oxidized-CNF and amine can be heated to a temperature ranging from about 100° C. to about 300° C., preferably from about 150° C. to about 250° C., more preferably from about 180° C. to about 200° C. In some embodiments, the oxidized-CNF and amine may be maintained under an inert atmosphere, such as nitrogen. The reaction between the oxidized-CNF and amine may occur for a period of time ranging from about 12 hours to about 30 hours, preferably from about 15 hours to about 25 hours, more preferably from 18 hours to about 22 hours.

After the reaction has occurred, the resulting suspension can be filtered, washed with a solvent such as tetrahydrofuran (THF), water, hexane, combinations thereof, or with different solvents in separate steps. After washing, the recovered material may be subsequently dried in vacuo to obtain the MNCF. In some embodiments the drying step can occur at a temperature ranging from about 50° C. to about 90° C., preferably from about 60° C. to about 80° C. Where desired, the degree of modification of the CNF can be checked utilizing methods known to those skilled in the art, such as Raman spectroscopy, thermal gravimetric analysis (TGA), infrared spectroscopy and nuclear magnetic resonance (NMR).

The modified carbon nanofibers of the present disclosure have enhanced compatibility with polyolefins and, once prepared, can be dispersed in a polyolefin at the molecular level, i.e., single fiber or single tube level, to produce nanocomposite mixtures. Suitable polyolefins for use in producing the nanocomposites of the present disclosure include, but are not limited to, polyethylene, polypropylene, ethylene-propylene copolymers and ultra-high molecular weight polyethylene (UHMWPE). Other polyolefins which may be utilized include High Pressure, Low Density Polyethylenes (LDPE); Linear Low Density Polyethylenes (LLDPE); Linear Medium Density Polyethylenes, High Density Polyethylenes (HDPE); and Modified Polyethylenes.

The nanocomposites of polyolefin/modified carbon nanofiber can be made by methods known to those skilled in the art. In one embodiment, especially where an alkene is used as the modifier, a modified carbon nanofiber nanocomposite may be produced by a two-step procedure, which involves solution blending followed by melt blending. In such a case the polyolefin can first be blended with the modified carbon nanofibers in a solution blending process whereby the modified carbon nanofibers are blended with the polyolefin in a suitable solvent, e.g. xylene or a low molar mass paraffin (e.g. decalin), and then precipitated in cold methanol. For the solution blending step, a conventional blending device such as a Henschel® mixer, or a soaking device such as a simple drum tumbler can be used. In the second step, the dried precipitants can be melt-blended to form the nanocomposites of the present disclosure. For the melt blending step, the mixture can be heated to melting while agitating the mixture, and then cooling the nanocomposite.

Examples of equipment used in melt blending methods include co-rotating and counter-rotating extruders, disc-pack processors and other commonly used extrusion equipment. Other equipment that may be used include roll mills, biaxial screw kneading extruders, or Banbury® or Brabender® mixers. In one embodiment, the melt blending may be accomplished by introducing the dry precipitants into a DACA twin-screw micro-compounder at 190° C. for 3 minutes under the presence of an antioxidant such as IRGANOX 3114, commercially available from Ciba Specialty Chemicals (Tarrytown, N.Y.). Other antioxidants known to those skilled in the art may also be used and include, for example ETHANOX® antioxidant (commercially available from Albemarle Corp., Baton Rouge, La.); BNX® DLTDP antioxidant (commercially available from Mayzo Inc., Norcross, Ga.).

In another embodiment, especially where an alkene is used as the modifier, solution blending of the polyolefin and modified carbon nanocomposite can occur in a one-step process to form the MCNF. In such a case, the modified carbon nanofiber and polyolefin can be introduced in low-molar mass paraffin oil or similar material such as paraffin melt at a temperature ranging from about 60° C. to about 170° C., typically from about 120° C. to about 140° C., and the resulting nanocomposite can later be precipitated in cold methanol.

In yet another embodiment, especially where an amine is used as the modifier, MCNFs may be added to decalin, low molar mass paraffin oils or xylene to form a uniform suspension under ultrasonic vibration at room temperature. The amount of MCNF in the decalin suspension may range from about 0.05% to about 20% by weight of the total suspension, more typically from about 1% to about 10% by weight of the total suspension.

The polyolefin, such as a UHMWPE, may be added to a separate amount of decalin, low molar mass paraffin oils or xylene to form a UHMWPE solution. The amount of UHMWPE added to decalin to form this solution may range from about 0.1% to about 15% by weight of the total solution, more typically from about 0.5% to about 10% by weight of the total solution.

The MCNF/decalin suspension and UHMWPE/decalin solution may then be combined to form a mixture. In some embodiments, the mixture may be heated to a temperature ranging from about 60° C. to about 170° C., typically from about 100° C. to about 150° C., more typically from about 130° C. to about 140° C. for a period of time ranging from about 30 minutes to about 300 minutes, typically from about 80 minutes to about 100 minutes under vigorous stirring to form a homogeneous suspension. The mixture may then be allowed to cool to room temperature, at which point the decalin may be extracted from the suspension.

The MNCF/UHMWPE may then be melt mixed utilizing means known to those skilled in the art with an antioxidant such as 3-(3,5-di-tert-butyl-4-hydroxy)phenyl propanate (or other antioxidants known to those skilled in the art such as ETHANOX® antioxidant, BNX® DLTDP). The amount of antioxidant can range from about 0.1 wt % to about 2 wt % based on the amount of UHMWPE, typically from about 0.3 wt % to about 1 wt % based on the amount of UHMWPE. In one embodiment, 3-(3,5-di-tert-butyl-4-hydroxy)phenyl propanate is used as an antioxidant in an amount of about 0.5 wt % based on the amount of UHMWPE and combined with the MNCF/UHMWPE using a twin-screw blender (such as those commercially available from DACA Instruments). The mixing can occur for a period of time ranging from about 1 minute to about 15 minutes, preferably from about 2.5 minutes to about 10 minutes, more preferably from about 4 minutes to about 6 minutes. The mixing can occur at a temperature ranging from about 100° C. to about 200° C., typically from about 150° C. to about 190° C., more typically at a temperature ranging from about 160° C. to about 180° C., to prevent thermal degradation.

The nanocomposite of the present disclosure may contain from about 0.01 wt % to about 30 wt % MCNF, typically from about 0.05 wt % to about 15 wt % MCNF, more typically from about 0.1 wt % to about 5 wt % MCNF. Thus, the nanocomposite of the present disclosure may contain from about 99.99 wt % to about 70 wt % polyolefin, typically from about 99.95 wt % to about 85 wt % polyolefin, more typically from about 99.9 wt % to about 95 wt % polyolefin.

The resulting nanocomposite may then be used to form fibers or films using commercially available equipment and techniques. They can be either melt-spun or gel-spun into fibrous form, or melt-cast or gel-cast into film form, with or without uni-axial/bi-axial stretching for alignment of the modified carbon nanofibers. This minimizes stress to the modified carbon nanofibers and results in improved mechanical and electrical properties as well as improved fire retardant properties.

In one embodiment, nanocomposites of the present disclosure may be spun into fibers pursuant to the process set forth in Ran et al., "In-Situ Synchrotron SAXS/WAXD of Melt Spinning of Modified Carbon Nanofiber and Polypropylene Nanocomposite", from ACS PMSE, 89, 735-736 (2003), the contents of which are incorporated by reference herein.

In another embodiment, the nanocomposites of the present disclosure may be formed into films utilizing techniques known to those skilled in the art. Suitable methods for forming films include, but are not limited to, extrusion, melt-press, blowing, injection molding, and/or thermal molding.

In one embodiment, the film may be formed utilizing a melt-press method by heating the MCNF/UHMWPE nanocomposite to a temperature ranging from about 100° C. to about 210° C., typically from about 140° C. to about 200° C., more typically at a temperature ranging from about 170° C. to about 190° C. and placing the film into a press at a pressure ranging from about 0.5 MPa to about 10 MPa, typically from about 1.0 Ma to about 5.0 MPa, more typically from about 1.5 MPa to about 2.5 MPa. The nanocomposite can held in the press under this pressure for a period of time ranging from about 1 minute to about 30 minutes, typically from about 3 minutes to about 10 minutes, more typically from about 4 minute to about 6 minutes, and is then quenched in a suitable material, such as ice water. The resulting film can have a thickness ranging from about 0.05 mm to about 2.5 mm, typically from about 0.11 mm to about 1.0 mm, more typically from about 0.15 mm to about 0.5 mm.

Without wishing to be bound by any theory, where the MCNF of the present disclosure is combined with a polyolefin such as a UHMWPE, it is believed the presence of the oligomeric hydrocarbon layer on the MCNF surface can plasticize the long UHMWPE chains in the vicinity of MCNF, thus resulting in interfacial flow under stretching and enhancement of the elongation-to-break ratio of the nanocomposite of the present disclosure.

While the above disclosure has focused on the modification of carbon nanofibers and their combination with polyolefin matrices to produce nanocomposites of the present disclosure, other carbon nanotubes, including SWNT and MWNT, can also be modified utilizing the methods of the present disclosure described above and combined with polyolefin matrices described above to produce nanocomposites of the present disclosure.

The following non-limiting examples are provided to illustrate the methods and nanocomposites described herein.

EXAMPLES

Nanocomposite fibers of the present disclosure were prepared from polyolefin matrices and CNFs utilizing the following materials. Isotactic polypropylene (iPP) pellets were an experimental resin provided by Exxon-Mobil Company, having a weight average molecular weight about 350,000 g/mol. The ultra high molecular weight polyethylene (UHMWPE) powders were obtained from Basell, USA, having a molecular weight about 5,000,000 g/mol and a polydispersity over 9.0. The carbon nanofibers (CNF, PR-24-HHT) were obtained from Pyrograf Products, Inc., which had undergone a severe thermal treatment to remove any non-carbon material. The typical morphology of the as-received CNFs had an average diameter of 70 nm and a length of 50-100 μm. The CNFs were clean, so no additional purification procedures were taken in this study.

All reagents were purchased from Aldrich, Acros, and the solvents purchased were from Fisher Scientific. Styrene and Triethylamine (TEA) were distilled from $CaH_2$. Tetrahydrofuran (THF) was dried by sodium under nitrogen. Other reagents were used without purification. Silica gel for flash chromatography was Merck grade 60 (70-230). The polymerization initiators, 1-(Benzyloxy)-2-phenyl-2-(2',2',6',6'-tetramethyl-1'-piperidinyloxy)ethane (TEMPO-ester) and 1-Hydroxy-2-phenyl-2-(2',2', 6',6'-tetramethyl-1'-piperidinyloxy)ethane (TEMPO-alcohol), were synthesized according to procedures known to those skilled in the art.

Example 1

Acid group generation on carbon nanofibers. Surface acidic groups (carboxylic acid and hydroxyl) were generated on the carbon nanofibers by oxidation reaction with potassium perchlorate/sulfuric acid solution (e.g. 2 g of carbon nanofibers in $KClO_3$ solution (2 g of $KClO_3$/100 ml of concentrated $H_2SO_4$)) at room temperature. The carbon nanofiber suspension was filtered by 0.2-μm membrane and washed with deionized water and methanol. The filtered oxidized nanofibers were dried in vacuo at 70° C.

Example 2

Attachment of radical initiator to the carbon nanofiber surfaces. The oxidized CNFs from Example 1 were refluxed in thionyl chloride for 24 hours at 65° C., then the thionyl chloride was removed by distillation. The dried acyl chloride CNFs were reacted with TEMPO-alcohol in dry THF using TEA as a catalyst at 75° C. for 2 days. The reaction mixture was washed with water and THF and dried in vacuo at 70° C. leaving initiator-attached CNFs.

Example 3

Surface free radical polymerization. The initiator-attached CNFs produced in Example 2 were mixed with isoprene (the mole ratio of initiator to isoprene was about 1:480). The mixture was heated at 130° C. for 10 hours. After the polymerization, the modified CNFs were washed with methanol and dried in vacuo at 70° C.

Example 4

Reduction of the grafted polymer. The modified CNFs of Example 3 were dispersed in xylene. p-toluenesulfonyl hydrazide and tri-n-propyl amine were added to the solution mixture. The mixture was heated to reflux at 140° C. for 4 hours. The solution was filtered, washed with deionized water and methanol, and dried in vacuo at 90° C.

Example 5

Nanocomposite preparation. In order to obtain a homogeneous iPP/modified carbon nanofiber nanocomposite, a two-step procedure was used to blend iPP with the modified carbon nanofibers obtained from Example 4. The first step was solution blending, in which 5%, 20% and 50% (weight) modified carbon nanofibers were blended with iPP in xylene at 130° C. and then precipitated in cold methanol. The dried precipitants were then melt-blended to form the composite by a DACA twin-screw micro-compounder at 190° C. for 3 minutes in the presence of the antioxidant IRGANOX 3114.

A similar one-step process was also used to prepare UHMWPE/modified carbon nanocomposites. Solution blending of 5%, 20% and 50% (weight) modified carbon and UHMWPE in paraffin oil at 130° C. was carried out and nanocomposite samples were precipitated in cold methanol.

Example 6

Nanocomposite fiber spinning. A melt spinning process was utilized to produce iPP/modified carbon nanofiber (MCNF) nanocomposite fibers. The process was carried out using a custom-built spinning apparatus. In this apparatus, a capillary rheometer-like barrel was located on the top platform, which held the polymer composite melt with an upper temperature capability of about 350° C. A motor driven plunger was used to extrude the polymer composite melt. A take-up wheel with an adjustable speed control provided the means to change the spin draw ratio (SDR), defined as the ratio of the fiber take-up speed to the extrudate speed at the spinneret exit. The melt extrusion temperature of iPP/modified carbon nanofiber nanocomposite was set at 195° C.

Scanning electron microscope images of the nanocomposite fiber were obtained. The SEM image of the cross-section of the nanocomposite fiber, which is set forth in FIG. 1, clearly showed that the MCNFs were dispersed mostly as single fibers, not as bundles, indicating that the surface modification was successful.

The gel spinning process of UHMWPE/modified carbon nanofiber nanocomposite fiber was carried out using the same custom-built spinning apparatus. Gel solutions of 5 wt % of UHMWPE/modified carbon nanofiber nanocomposite of different composition ratios in paraffin oil were prepared for this study. The gel spinning temperature was set at 130° C.

Example 7

Acid group generation on carbon nanofibers. Carbon nanofibers (PR-24-HHT) were obtained from Pyrograf Products, Inc. without further purification. The as-received CNF sample was thermally treated to remove the non-carbon material and had an average diameter of 100 nm and a length of 50-100 μm. A SEM image of the as-received CNF sample is provided as FIG. 3. The surface modification of the CNF was carried out as follows. The surface acidic groups (carboxylic acid and hydroxyl) on the carbon nanofibers (CNFs) were generated by an oxidation reaction using potassium chlorate/sulfuric acid solution following the general reaction scheme set forth in U.S. Pat. No. 5,611,964, the contents of which are incorporated by reference herein.

The amount of carboxylic acid group on the surface of oxidized-CNF was determined by titration using $NaHCO_3$ solution following the general procedures set forth in Hu, et al., "Determination of the Acidic Sites of Purified Single-wall Carbon Nanotubes by Acid-base Titration" *Chem. Phys. Lett.* (2001), vol. 345, pp. 25-28. Typically, after 4 days of oxidation, the carboxylic acid value on the CNF surface was 0.76 mmol/(g CNF), corresponding to a level that every 109 carbon in the CNF, in bulk, had one carboxylic acid group that could be grafted/modified. Some of the oxidized CNFs were set aside and utilized for comparative purposes as described in greater detail below.

Example 8

Modification of the oxidized-CNFs with octadecylamine. The oxidized-CNFs from Example 7 were dispersed in octadecylamine (having 18 carbons), which was maintained at 180-200° C. under nitrogen for 20 hours. The resulting suspension was filtered, washed with THF and then with hexane, and subsequently dried in vacuo at 70° C.

Example 9

The degree of modification of the carbon nanofiber was checked with Raman spectroscopy and thermal gravimetric analysis (TGA) by comparing the as-received CNF described in Example 7, the oxidized-CNF produced in Example 7, and the MCNF produced in Example 8. The Raman spectra of the as-received CNF, oxidized-CNF and MCNF were collected using a Renishaw 2000 spectrometer with a 500 mw, 785 nm HPNIR785 laser (Renishaw Inc., U.K.). The TGA scans of CNF, oxidized-CNF and MCNF were collected at 20° C./minute by using a TGA 7 from Perkin-Elmer Inc.

Figure 2:
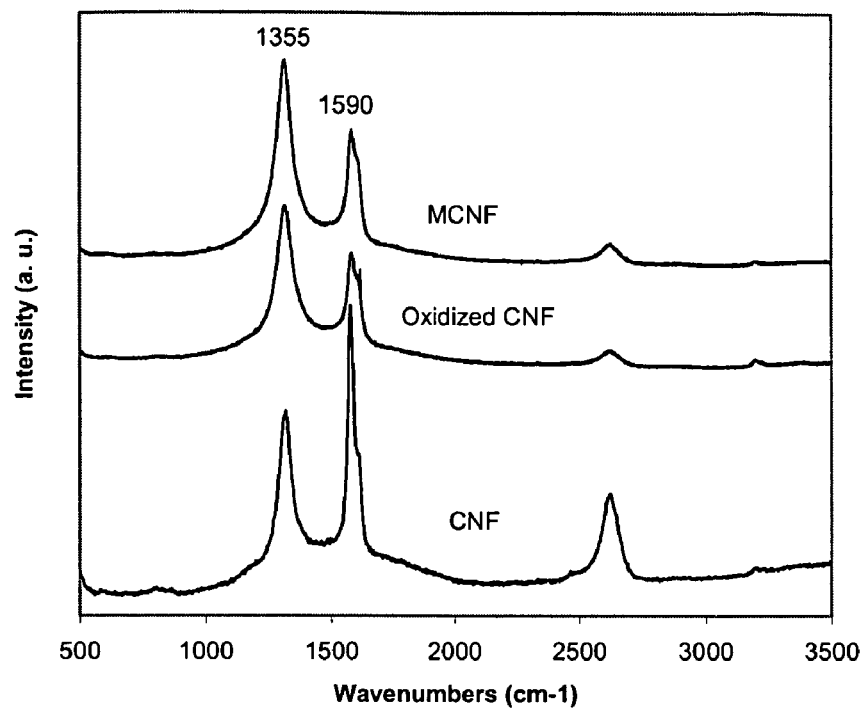
FIG. 2A is a graph of the Raman spectra obtained for CNF, oxidized CNF, and MCNF.
FIG. 2B is a graph of the thermogravimetric analysis (TGA) results obtained for CNF, oxidized CNF, and MCNF.
Figure 2:
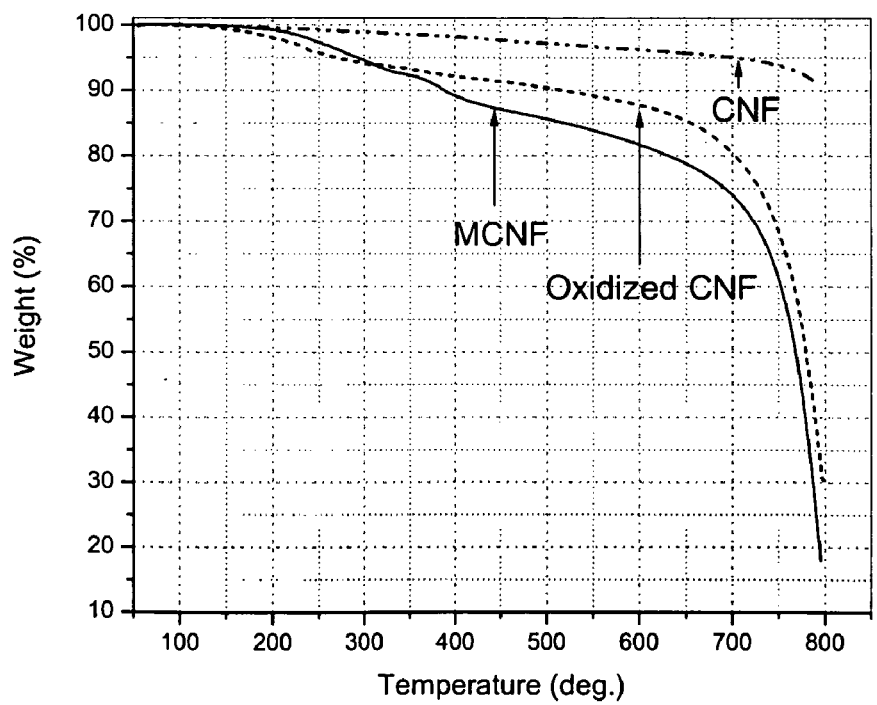

The Raman spectra of CNF, oxidized CNF and MCNF are set forth in FIG. 2A. In the Raman spectra, the ratio (ID/IG) can be taken as a measure of the crystalline order in the graphitic system, where ID represents the intensity of the disordered band (D-band) at 1355 $cm^{-1}$ and IG represents the intensity of the graphitic band (G-band) at 1590 $cm^{-1}$. A small ID/IG ratio indicates few defects, small amorphous carbon, and high graphitic order on the surface. It was found that after oxidation, the ID/IG ratio increased from 0.73 for the as-received CNF to 1.3 for the oxidized CNF, indicating that the crystalline order of graphite on the CNF surface decreased. The ID/IG ratio of MCNF was 1.4, indicating that the amidation reaction did not significantly change the CNF surface.

The TGA scans of CNF, oxidized CNF and MCNF are set forth in FIG. 2B. The as-received CNF exhibited a higher thermal stability than the oxidized-CNF and MCNF. For the MCNF, a distinct weight loss in the range of 300-400° C. corresponded to the decomposition of the octadecylamide molecules, where the weight difference between oxidized-CNF and MCNF was about 5%. This data indicated that only about 30% of the carboxylic acid groups on the surface of MCNF were converted to octadecylamide groups (i.e., 70% of carboxylic acid groups were not grafted with octadecylamine).

Example 10

Nanocomposite film preparation. Three nanocomposite samples were prepared by combining UHMWPE with varying amounts of MCNF produced in Example 8, so that the resulting nanocomposite had MCNF in amounts of 0.2 and 5 wt %, respectively.

The MCNFs produced in Example 8 (or oxidized-CNF from Example 7) were first added to decalin to form a uniform suspension under ultrasonic vibration at room temperature. At the same time, a polyolefin solution was prepared by combining decalin with a UHMWPE (1900 H) provided by Basell, USA, which had a weight-average molecular weight ($M_w$) of $6 \times 10^6$ g/mol and a polydispersity of about 9, to obtain a 1 wt % UHMWPE/decalin solution. The MCNF suspension was subsequently added to the 1 wt % UHMWPE/decalin solution and the resulting MCNF/UHMWPE/decalin mixture was ten heated to 130-140° C. for 90 minutes under vigorous stirring and formed a homogeneous suspension. Upon being cooled to room temperature, decalin was extracted from the suspension. The sample was then melt mixed with 0.5 wt % (based on the amount of UHMWPE) of an antioxidant, 3-(3, 5-di-tert-butyl-4-hydroxy)phenyl propanate, using a twin-screw blender (DACA Instruments) at 170° C. for 5 minutes to prevent thermal degradation. The recovered sample was dried in a 60° C. oven to constant weight.

For comparison purposes, a nanocomposite oxidized-CNF/UHMWPE sample having 0.2 wt % of oxidized-CNF obtained from Example 7, but with no further modification, was also prepared using the same procedure. In addition, a UHMWPE with no added MCNF (thus 0% MCNF) was also utilized for comparison.

Samples of the MCNF/UHMWPE, oxidized-CNF/UHMWPE and untreated UHMWPE were then melt-pressed into flat films (with a thickness of about 0.2 mm) under the following press conditions: The temperature was 180° C., the pressure was 2.1 MPa, and the hold time was 5 minutes, followed by quenching in ice water.

Example 11

Nanocomposite Film Analysis

SEM analysis. The surface and the cross-section views of the films produced in Example 10 were examined by scanning electron microscopy (SEM) utilizing a LEO1550 (LEO, USA). The cross-section view of the fibers was obtained by fracturing the nanocomposite films in liquid nitrogen. A typical SEM image of the as-received CNF sample is provided as FIG. 3; a typical SEM image of the cross-sectioned MCNF/UHMWPE nanocomposite film possessing 5 wt % MCNF is provided as FIG. 4.

In both nanocomposites, the dispersion of MCNF in UHMWPE (0.2 wt % and 5 wt %) was extremely good, even when the MCNF content was increased to 5 wt %. For example, SEM examination of the cryogenically fractured nanocomposite film containing 5 wt % MCNF did not show any sign of MCNF aggregation in the UHMWPE matrix and the interfacial adhesion between MCNF and UHMWPE was found to be excellent (see FIG. 4).

DSC analysis. Differential scanning calorimetry (DSC) measurements were carried out on the nanocomposite MCNF/UHMWPE films of Example 10 and untreated UHMWPE films (0% MCNF) utilizing a TA Instrument DSC 7. All samples were heated at 10° C./minute up to 200° C. and then cooled at the same rate, under a nitrogen gas flow. The degree of crystallinity in each sample was calculated using the measured heat of fusion ($\Delta H_f$), assuming the heat of fusion for perfect PE crystals (100% crystallinity) is equal to 290 J/g. Additional heat of fusion measurements were taken where the weight of MCNF was not included in the calculation. The results of the DSC measurements are set forth in Table 1 below.

TABLE 1

The melting temperature and crystallinity of UHMWPE and MCNF/UHMWPE nanocomposite films determined by DSC

| MCNF concentration (%) | 0 | 0.2 | 5 |
| --- | --- | --- | --- |
| Melting point (° C.) | 133.6 | 132.9 | 132.1 |
| $\Delta H_f$ (J/g) | 110.3 | 115.2 | 115.0 |
| $\Delta H_f$ (J/g)* | 110.3 | 115.4 | 121.0 |
| Crystallinity (%) | 38.0 | 39.7 | 39.8 |

*Did not consider the weight of MCNF

WAXD and SAXS analysis. In-situ wide-angle X-ray diffraction (WAXD) and small-angle X-ray scattering (SAXS) experiments were carried out on the films using the Advanced Polymers Beamline (X27C) in the National Synchrotron Light Source (NSLS), Brookhaven National Laboratory (BNL). Samples tested included the MCNF/UHMWPE and oxidized-CNF/UHMWPE composite films produced in Example 10 above, as well as the untreated UHMWPE film (0% MCNF) described in Example 10.

The details of the experimental setup of the X27C beam/line have been reported by Chu, et al., "Small Angle X-ray Scattering of Polymers", *Chemical Reviews*, (2001), vol. 101 (6), p. 1727, the contents of which are incorporated by reference herein. The wavelength used was 0.1366 nm. A three-pinhole collimation system was used to define the incident beam from a double multi-layered monochromator. The sample-to-detector distance for WAXD was 1117.8 mm, and that for SAXS was 1189.8 mm. A MAR-CCD (MAR USA, Inc.) two-dimensional X-ray detector was used for the real-time data collection. A typical image acquisition time was 15 seconds per image.

Each sample was uniaxially stretched using a modified Instron 4442 tensile apparatus, where symmetric deformation was carried out. The initial length between the Instron jaws was 10 mm.

The experiments were carried out at both room temperature and at high temperature (118° C.) using an environmental chamber. The chosen stretching rate was 0.5 mm/minute. The change on crystallinity was estimated from the WAXD pattern. In this calculation, the 2D pattern first underwent a Fraser correction and the peak area for each selected strong crystal reflection and the amorphous background were extracted by a 2D curve-fitting program as described in Ran, et al., "Mesophase as the Precursor for Strain-Induced Crystallization in Amorphous Poly(ethylene terephthalate) Film" *Macromolecules*, (2002), vol. 35, p. 10102, the contents of which are incorporated by reference herein. The crystallinity was calculated as the ratio of the total crystal peak area to total diffraction area (combining the crystal peak area and the amorphous background area).

In the SAXS analysis, the total integrated intensity was also calculated using a custom program as described in Ran, supra, which was proportional to the scattering invariant.

Figure 5:
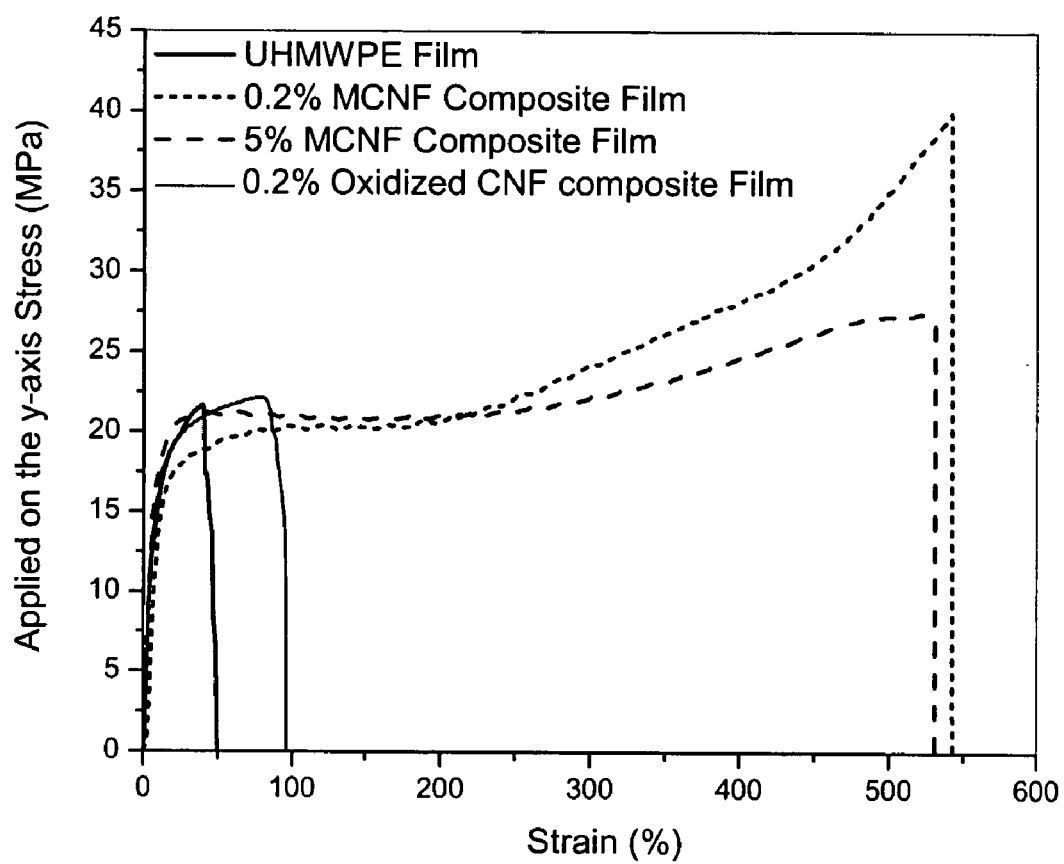
FIG. 5 is a graph of the stress-strain curves obtained of the melt-pressed UHMWPE, oxidized-CNF/UHMWPE and MCNF/UHMWPE (with 0.2 wt % MCNF and 5 wt % MCNF) films.

The stress-strain curves of neat UHMWPE, oxidized-CNF/UHMWPE and MCNF/UHMWPE (with 0.2 wt % and 5 wt % MCNF) films are shown in FIG. 5. While the initial moduli of these samples were about the same, both MCNF/UHMWPE nanocomposite films (i.e., 0.2 wt % and 5 wt % MCNF) exhibited significant increases in the elongation-to-break ratio (ca. 10 times more than that of neat UHMWPE). The 0.2 wt % oxidized-CNF film also showed an increase in the elongation-to-break ratio (ca. 2 times more than that of neat UHMWPE), but substantially less that that of the MCNF/UHMWPE nanocomposites. The performance of the 0.2 wt % MCNF sample was unexpected, as it showed the highest values of elongation-to-break ratio and of ultimate tensile strength.

The toughness improvement of the MCNF/UHMWPE nanocomposites was indirectly probed by monitoring the crystal structural changes in UHMWPE during stretching using in-situ synchrotron wide-angle X-ray diffraction (WAXD) described above. It is well known that in PE, the stable orthorhombic phase can be transformed into the metastable monoclinic phase by stress. This process is called martensitic transformation, of which there are four principal modes: T11, T12, T21 and T22. From the 2D WAXD data, a crystal martensitic transformation, corresponding to the conversion of orthorhombic to monoclinic crystal structure in PE, was seen in both nanocomposite samples.

Figure 6:
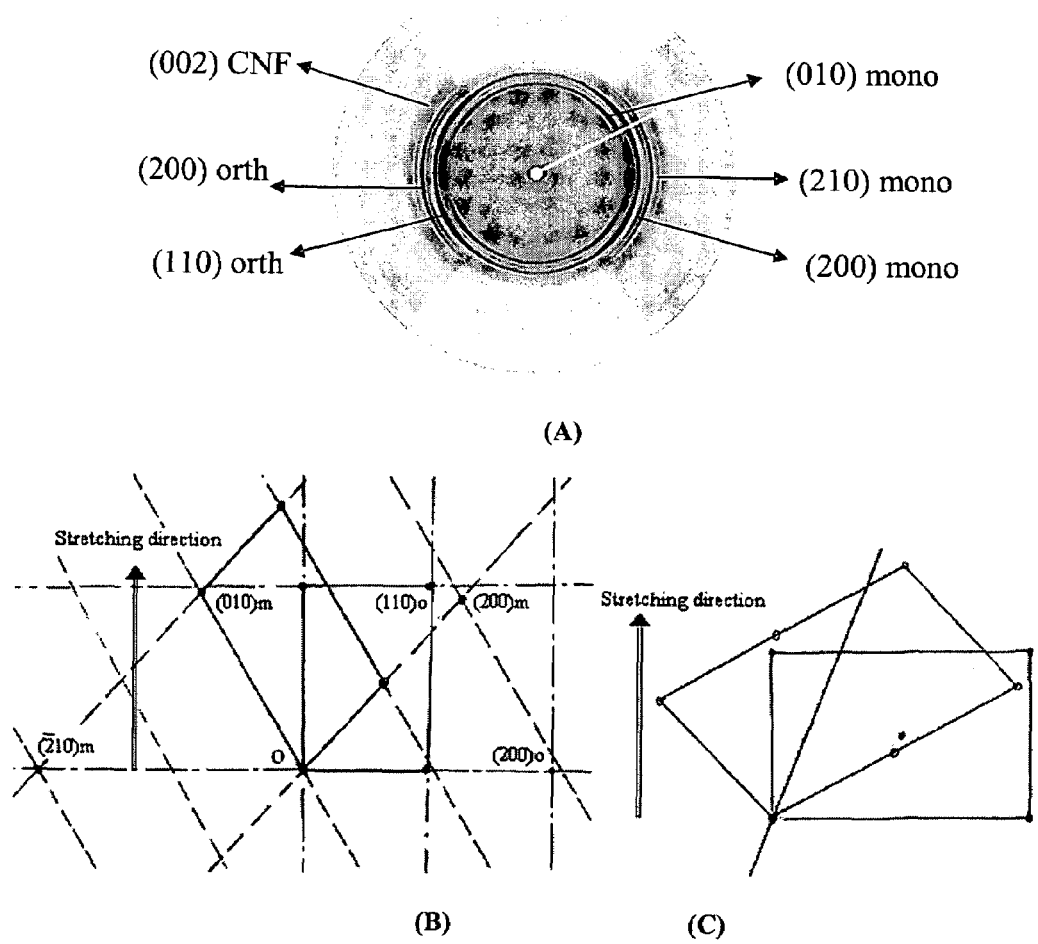
FIG. 6A is a 2D WAXD pattern of 5 wt % MCNF nanocomposite film under stretching at a strain of 208%.
FIG. 6B is a schematic representation mode of martensitic transformation of MCNF/UHMWPE composite film (monoclinic cell of polyethylene projected on (001) plane in reciprocal space.
FIG. 6C is a schematic representation mode of martensitic transformation of MCNF/UHMWPE composite film (monoclinic cell of polyethylene projected on (001) plane in real space.

A typical 2D WAXD pattern of the stretched 5 wt % MCNF nanocomposite (strain at 208%) containing both orthorhombic and monoclinic structures is shown in FIG. 6A, where the (200) and (110) reflections of the orthorhombic phase and the (010), (210) and (200) reflections of the monoclinic phase are indexed (the unit cell parameters for the monoclinic phase are given as follows: a=8.09 Å, b=4.79 Å; c=2.54 Å and γ=107.9°, where the unit cell parameters for the orthorhombic phase are as follows: a=7.42 Å, b=4.95 Å, c=2.54 Å). The diffraction angle and the corresponding d-spacing of each observed crystal peak are listed in Table 2 below.

TABLE 2

The values of 2θ and d-spacing of crystal diffraction peaks from 2D WAXD

| Peaks | 1 | 2 | 3 | 4 | 5 | 6 |
|---|---|---|---|---|---|---|
| 2θ (°) | 17.14 | 18.96 | 20.38 | 21.22 | 22.40 | 23.05 |
| d (Å) | 4.591 | 4.146 | 3.862 | 3.720 | 3.535 | 3.414 |
| (hkl) mono | 010 | | 200 | | $\bar{2}$10 | |
| (hkl) orth | | 110 | | 200 | | |
| (hkl) CNF | | | | | | 002 |

As depicted in FIG. 6A, a relatively azimuthal independent diffraction ring located at 2θ of 23.2° (d-spacing=0.34 nm) was also seen. This diffraction can be attributed to the interlayer reflection from the graphite stacking within the CNF, and was thus assigned the (002) peak of CNF.

Based on the schematic representation of the transformation mode illustrated in FIG. 6B (in reciprocal space) and 6C (in real space), the observed martensitic transformation in the 2D WAXD patterns of MCNF/UHMWPE nanocomposite film exhibited the T12 mode. Without wishing to be bound by any theory, it is believed this crystal transformation resulted from the large strain deformation in the non-crystalline phase, which was initiated by the interfacial flow.

The 2D WAXD data was analyzed to determine the total degree of crystallinity and the corresponding mass fractions of monoclinic and orthorhombic phases in 0.2 wt % and 5 wt % MCNF nanocomposite films. The results of this analysis are summarized in Table 3 below.

TABLE 3

Changes of crystallinity in monoclinic and orthorhombic phases as well as of total crystallinity during stretching of 0.2 wt % MCNF and 5 wt % MCNF films

| Elongation | Crystallinity of 0.2 wt % MCNF film (%) | | | Crystallinity of 5 wt % MCNF film (%) | | |
|---|---|---|---|---|---|---|
| (%) | Orth. | Mono. | Total | Orth. | Mono. | Total |
| 8 | 35.7 | 4.8 | 40.5 | 37.1 | 2.7 | 39.8 |
| 42 | 23.5 | 8.7 | 32.2 | 32.3 | 7.2 | 39.5 |
| 125 | 15.4 | 9.5 | 24.9 | 21.8 | 11.2 | 33 |
| 208 | 14.3 | 11.7 | 26.0 | 14.8 | 11.2 | 26.0 |
| 308 | 14.5 | 12.5 | 27.0 | 15.0 | 12.0 | 27.0 |
| 408 | 15.5 | 12.5 | 28.0 | 14.6 | 12.4 | 27.0 |
| 508 | 17.0 | 13.0 | 30.0 | 15.7 | 12.3 | 28.0 |

It can be seen from the above data that the total crystallinity was relatively low (around 40%) in both initial nanocomposite samples, which were dominated by the stable orthorhombic phase. At strains below 125%, the total crystallinity and the fraction of the orthorhombic phase decreased rapidly during deformation, while the fraction of the monoclinic phase increased accordingly. This indicated that some polyethylene chains in the orthorhombic crystal were pulled out, and some were further converted into the monoclinic phase. The destruction of the initial crystallites (dominated by the orthorhombic phase) was greater than the formation of the new crystallites (dominated by the monoclinic phase). At strains above 200%, a slight increase in the total crystallinity was seen in both samples, indicating that strain-induced crystallization took place, which was also consistent with the observation of strain-hardening behavior seen in FIG. 5.

Figure 3:
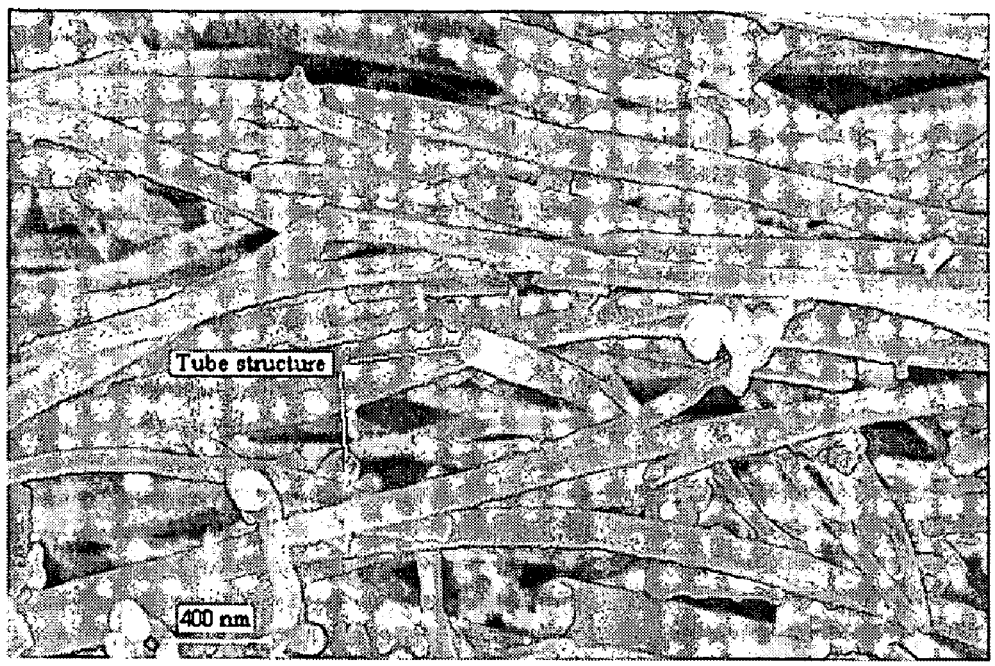
FIG. 3 is a typical SEM image of an untreated CNF sample.
Figure 4:
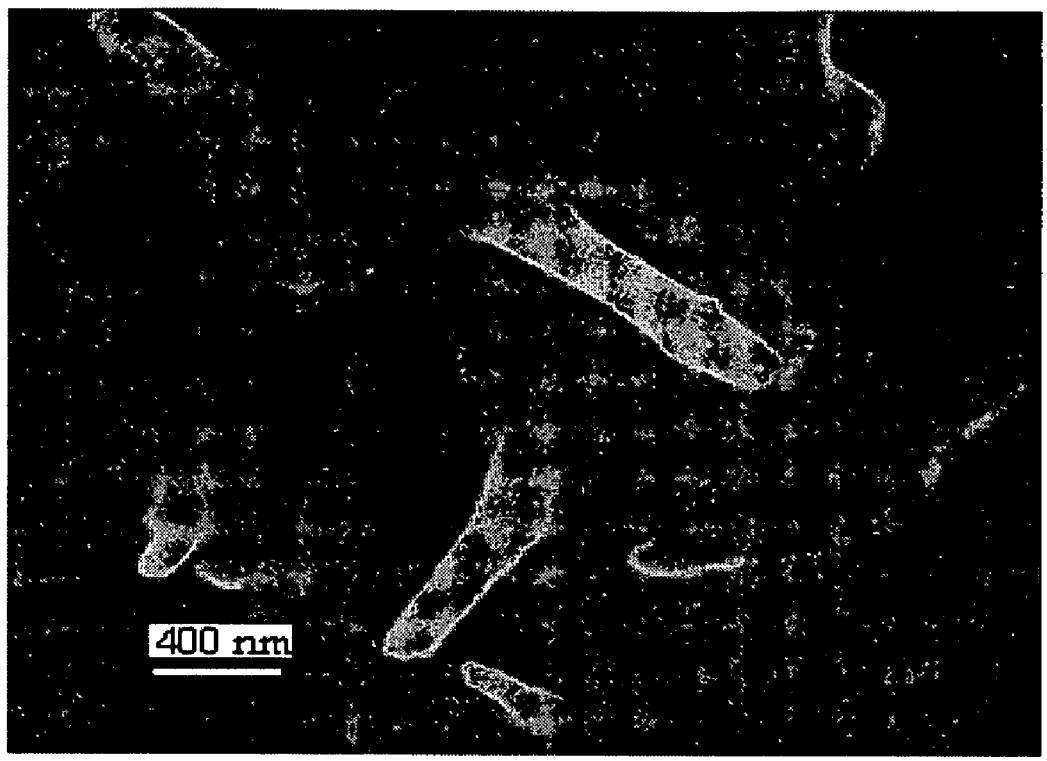
FIG. 4 is a typical SEM image of cross-sectioned MCNF/UHMWPE nanocomposite film containing 5 wt % MCNF.
Figure 7:
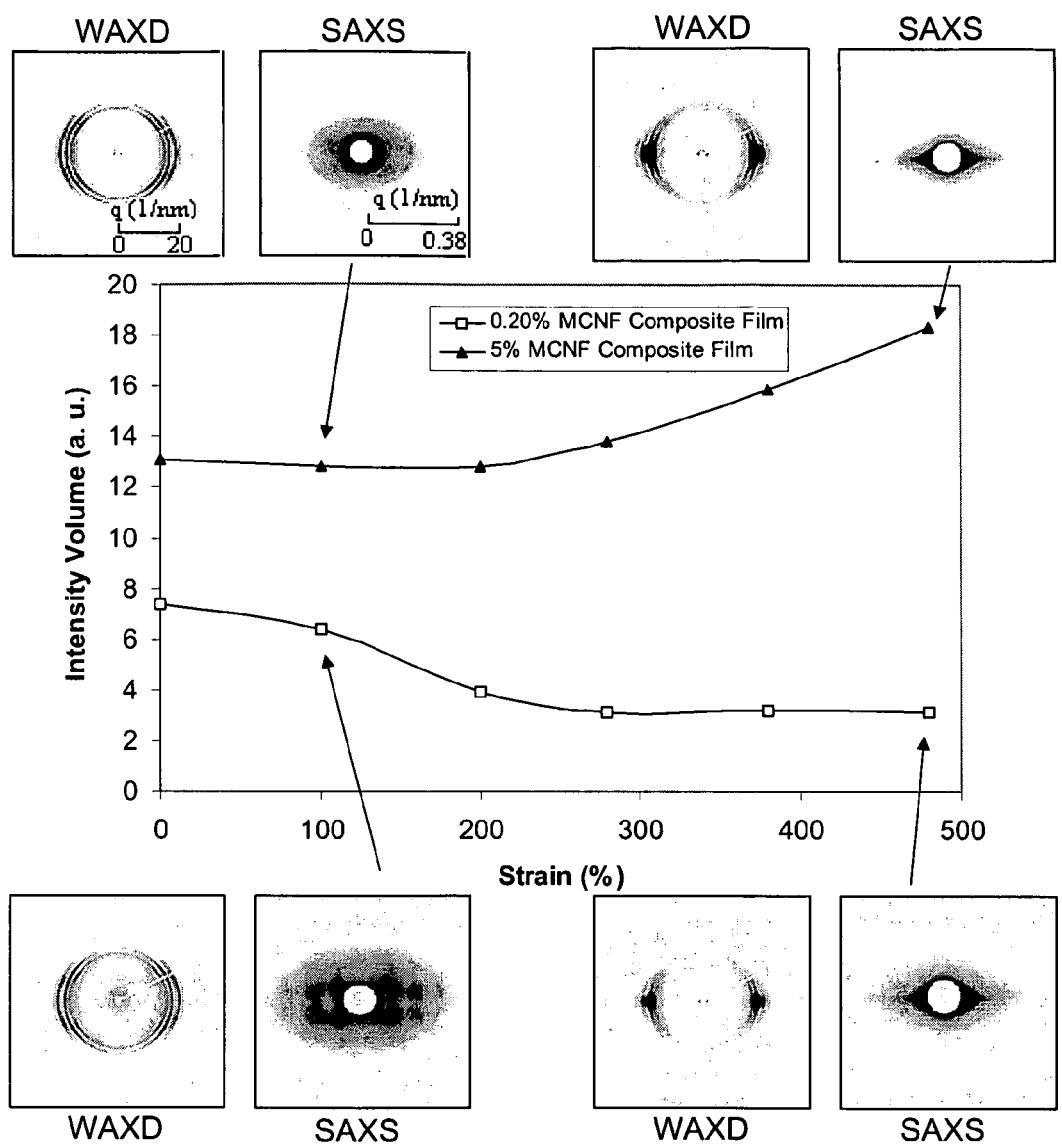
FIG. 7 is a graph depicting the total SAXS intensity changes in MCNF/UHMWPE nanocomposites during stretching at room temperature; also included are selected WAXD and SAXS patterns at strains of 100% and 480%, respectively.

The super-tough behavior in MCNF/UHMWPE nanocomposites was also probed by in-situ SAXS measurements described above. FIG. 7 illustrates the changes in the integrated SAXS intensity in both nanocomposite samples (0.2 wt % and 5 wt % MCNF), which exhibited an opposite trend (one increased with strain while the other decreased), during stretching at room temperature. Selected 2D WAXD/SAXS patterns collected at strains of 100% and 480% are also included in FIG. 7. While not wishing to be bound by any theory, it is believed that the measured SAXS intensity contained at least two contributions: (1) the void scattering from CNF (it is known that CNF has a tube-like structure (as seen in FIG. 3), which can cause scattering), and (2) the scattering due to the changes in crystallinity.

As seen in FIG. 7, the total intensity in the 5 wt % MCNF film was much higher than that of the 0.2 wt % MCNF film at the initial stage (0% strain), which can be attributed to the larger contribution of the void scattering from MCNF in the 5 wt % sample. For the 0.2 wt % MCNF film, the total intensity was found to decrease rapidly before the strain reached 200% and then reached a plateau value afterward, which was similar to the crystallinity change seen in Table 3. This was consistent with the crystallinity change because, during stretching, although the MCNF can be re-oriented, the SAXS intensity due to the void scattering of CNF was not expected to change. Thus, the decrease in the SAXS intensity in the 0.2 wt % film was mainly due to the crystallinity reduction at the initial stretching stage. For the 5 wt % MCNF film, the total scattering intensity of SAXS was found to increase with strain, which was opposite the intensity change for the 0.2 wt % MCNF film. Since the crystallinity changes in the two nanocomposite films during stretching were similar (as seen in Table 3), this observation indicated that some other unexpected factor must be involved and generated additional scattered intensity in SAXS. While not wishing to be bound by any theory, it is believed that at high MCNF concentrations the particulate interactions of MCNF became dominant, which generated some nanoscale voids in the polymer matrix during deformation, resulting in an increase in the total scattered intensity.

As seen in FIG. 7, selected WAXD and SAXS patterns collected at strains of 100% and 480% showed some interesting features. First, the SAXS image for the 0.2 wt % MCNF film at 100% strain exhibited a clear four-point pattern, indicating that a tilted structure was formed with respect to the stretching direction. As the tilt angle of the four-point pattern in SAXS was similar to that of the principle crystal diffraction peaks (e.g. orthorhombic (110) and monoclinic (010)) in WAXD, this finding indicated that the tilted structure was mainly caused by the chain tilting in the crystals. However, the four-point pattern could not be clearly identified in the SAXS image of the 5 wt % MCNF film, which was consistent with the presence of higher MCNF particulate interactions in the matrix.

At 480% strain, SAXS images of both nanocomposite films exhibited an equator streak pattern, indicating an oriented fibrillar structure in the samples. The corresponding WAXD images indicated that the crystal orientation was high, demonstrating that the equatorial streak in SAXS was due to scattering from non-correlated fibrillar-like crystal structures and scattering from non-correlated MCNF, both of which were aligned with the stretching direction.

In addition, the crystal orientation in the 0.2 wt % MCNF film was higher than that in the 5 wt % MCNF film, indicating higher particulate interactions in the 5 wt % MCNF film which hindered the reorganization of the polymer crystals during stretching.

Figure 8:
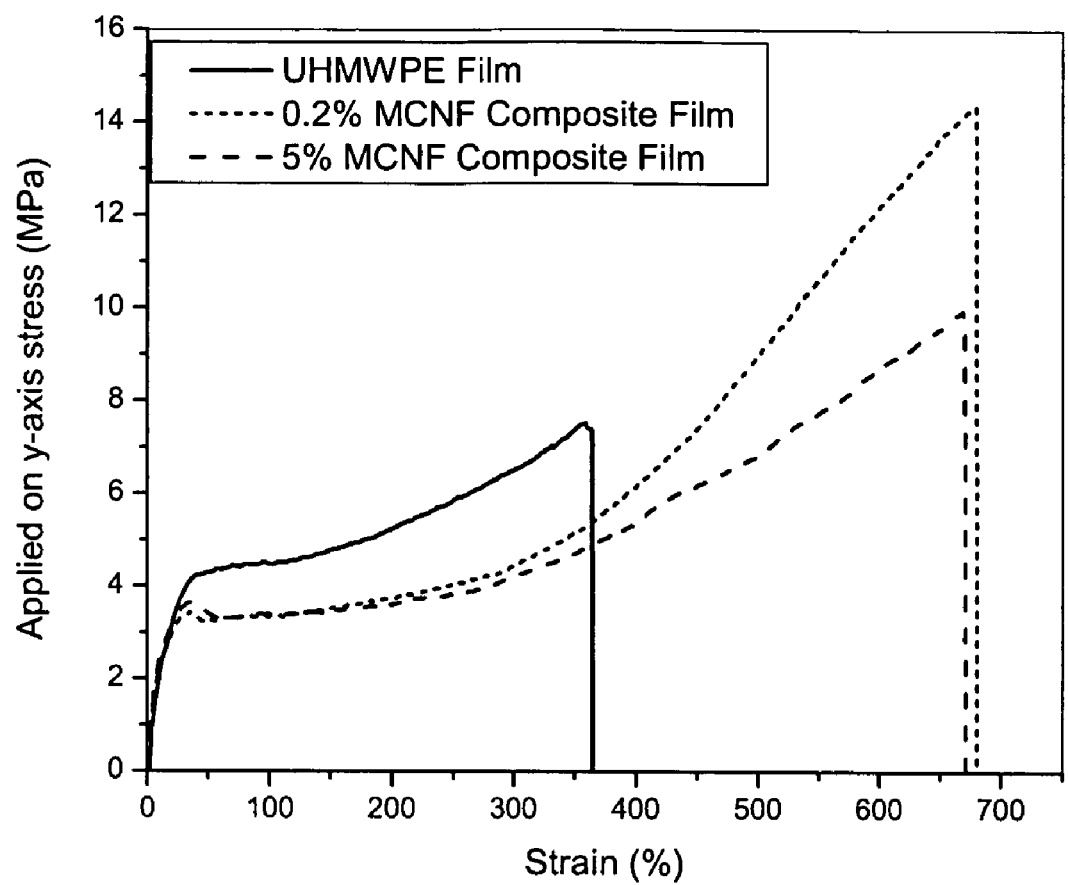
FIG. 8 is a graph of the stress-strain curves of the UHMWPE and MCNF/UHMWPE films at 118° C.

The nanocomposite films described above in Example 10 were then subjected to elevated temperatures to examine their toughness. FIG. 8 illustrates the stress-strain curves of UHMWPE and MCNF/UHMWPE films at 118° C. Compared with the stress-strain curves at room temperature, the elongation-to-break ratio of the pure UHMWPE film were found to increase significantly at 118° C. (from 50% at room temperature to 370%) due to the increased chain mobility at high temperature. The increased chain mobility apparently overcame some entanglement restraints in the UHMWPE matrix. However, the toughness of the MCNF/UHMWPE films was still higher (about 2 times higher) than that of the pure UHMWPE film as demonstrated by the high elongation-to-break ratios (ca. 680%, which was about a 20% increase from its room temperature value). The performance of the 0.2 wt % MCNF film showed not only the highest elongation-to-break ratio, but also the highest ultimo-tensile strength. The yield strengths of the nanocomposite films were lower than that of the pure UHMWPE film.

Figure 9:
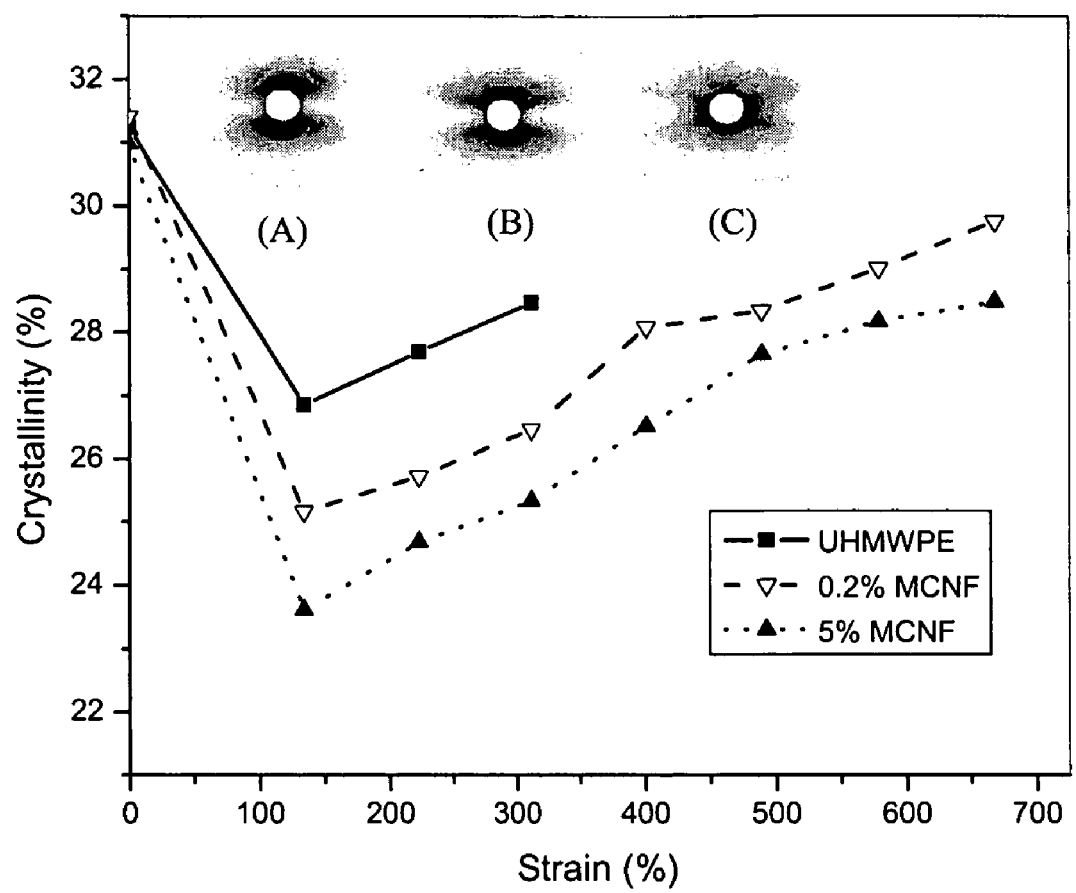
FIG. 9 is a graph depicting the changes of crystallinity for UHMWPE and MCNF/UHMWPE films at 118° C. and different strains. (The inset images represent the SAXS patterns of UHMWPE film (FIG. 9A); 0.2 wt % MCNF/UHMWPE film (FIG. 9B), 5 wt % MCNF/UHMWPE film (FIG. 9C), all at a strain of 130%.)

The crystallinity of these samples at 118° C. was also examined utilizing the procedures described above. The changes of crystallinity in UHMWPE and MCNF/UHMWPE films at 118° C. during deformation are shown in FIG. 9. As can be seen in FIG. 9, the crystallinity decreased abruptly in all samples at the initial stage of deformation (at strains below 130%), indicating that some crystal lamellae were destroyed by stretching, probably via the chain pulling mechanism. At strains above 130%, the crystallinity was found to increase almost linearly with strain, indicating the reformation of new crystallites (i.e., strain-induced crystallization). As set forth in FIG. 9, it was found that the reduction of the crystallinity increased with the content of MCNF; the 5 wt % MCNF film exhibited the lowest crystallinity.

As the melting point of the pure UHMWPE film (133.6° C.) was the highest among the samples, the average size of the PE crystals in pure UHMWPE film was probably also the largest, which would lead to a more stable crystal structure under deformation. The lower melting point in MCNF/UHMWPE suggested the presence of a less stable crystal structure, which could be easily destroyed or altered even under a low deformation strain.

This was confirmed by the high temperature SAXS images collected at strain of 130% (see FIG. 9). It was seen that the SAXS pattern of the 0.2 wt % film (see FIG. 9B) clearly exhibited the composite image of a cross pattern along the off-axis and a 2-point pattern along the meridian. The cross pattern indicated the presence of a tilted crystal structure, caused by the re-orientation of existing lamellae under deformation. The 2-point meridional pattern demonstrated the presence of a well-aligned lamellar structure with the normal of lamellae parallel to the deformation axis. At high MCNF content (see FIG. 9C), the cross pattern became more dominant in SAXS, while the corresponding scattered intensity also became weaker, indicating a greater degree of crystal destruction and/or re-orientation was achieved in the 5 wt % film under deformation at 118° C. In contrast, less crystal destruction and/or re-orientation was found in the pure UHMWPE film (see FIG. 9A).

Figure 10:
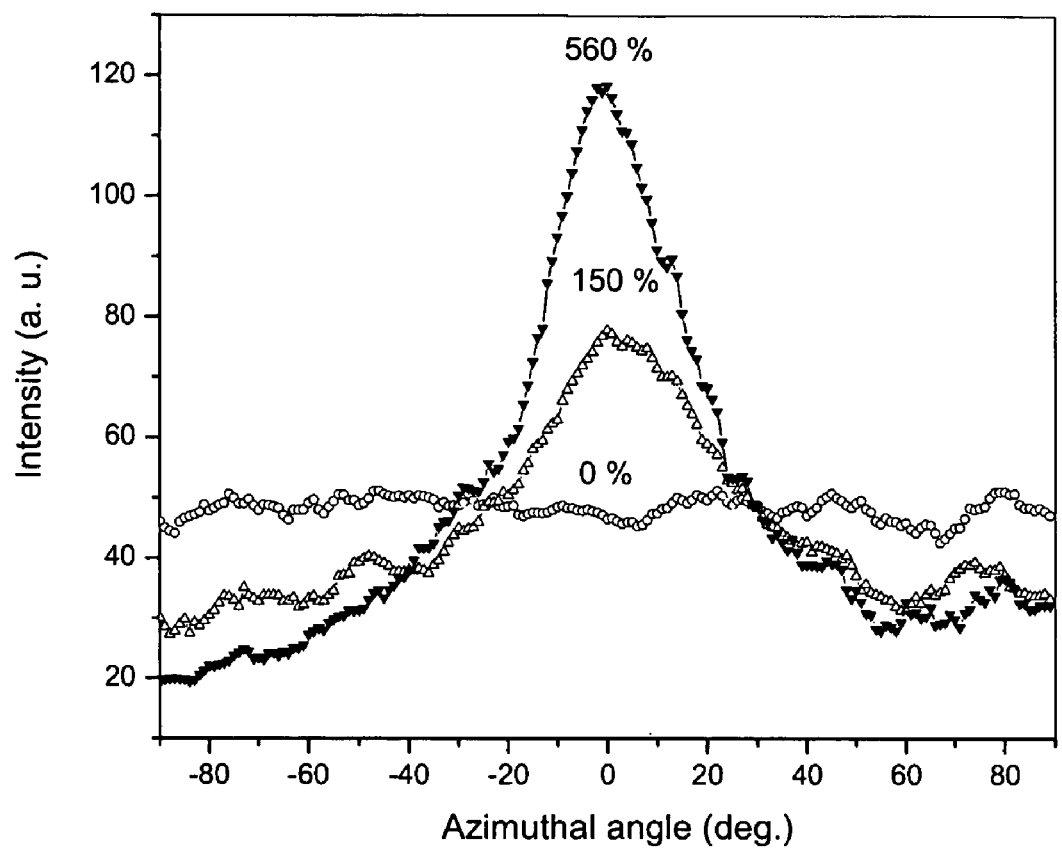
FIG. 10 is a graph depicting the azimuthal intensity profile at the (002) graphite plane ($q=1.862$ Å$^{-1}$) of MCNF at different strains (from the 2 D WAXD patterns of 5 wt % MCNF film).

In in-situ WAXD measurement of the MCNF/UHMWPE nanocomposite, the (002) crystal reflection due to the inter-spacing between the graphite planes in CNF was found to be anisotropic. The example azimuthal profiles taken at the (002) CNF reflection (d=3.41 Å$^{-1}$) at different strains for the 5 wt % MCNF/UHMWPE sample are shown in FIG. 10. It was found that the azimuthal profile of the (002) graphite plane was a flat line when strain was 0, indicating that MCNF was arranged randomly without preferred orientation before stretching. However, upon stretching, the azimuthal profile exhibited a large intensity increase in the equatorial direction ($\chi=0°$), indicating the realignment of MCNF along the stretching direction. The degree of MCNF orientation increased with the increase in deformation strain.

Figure 11:
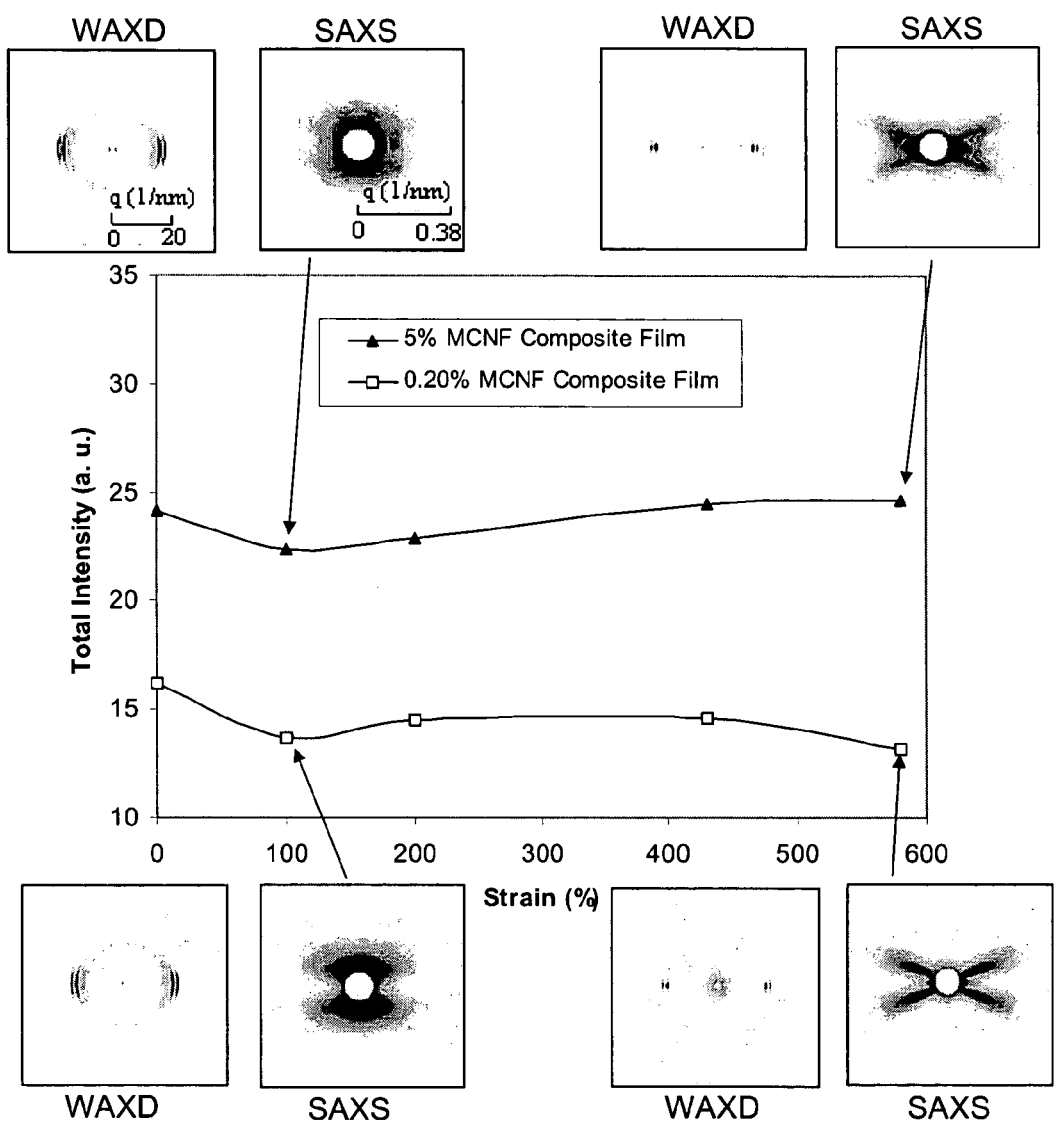
FIG. 11 is a graph depicting the total SAXS intensity changes in MCNF/UHMWPE nanocomposites during stretching at 118° C.; also included are selected WAXD and SAXS patterns at strains of 100% and 580%, respectively.

FIG. 11 shows the integrated SAXS intensity of UHMWPE and MCNF/UHMWPE films during stretching at 118° C. As set forth in FIG. 11, the scattered intensity in the 5 wt % MCNF film was still much higher than that of the 0.2 wt % MCNF film at the initial stage, which was due to larger void scattering from MCNF at high concentrations. The changes of the scattered intensity in both MCNF nanocomposite films exhibited a similar trend: the scattered intensity decreased at strains below 100%, but increased slightly afterward. This behavior was almost the same as the crystallinity change illustrated in FIG. 9, indicating that the scattered intensity was mainly resulted from the crystallinity change. For the 0.2 wt % MCNF film, the change of the scattered intensity at high temperature was similar to that at room temperature. But for the 5 wt % MCNF film, the behavior was quite different. There appeared to be no excessive void scattering generated from the particulate interactions at high temperature, which could be attributed to a large increase of the chain mobility in the matrix, which minimized the filler effect.

As set forth in FIG. 11, the WAXD images collected at 580% strain showed a highly oriented PE crystal diffraction pattern in both nanocomposite samples. The Hermann orientation factors calculated from the principle crystal diffraction peak (e.g. (110)) in these WAXD images all approached the value of 1, indicating that the crystal orientation in UHMWPE was nearly perfect. For the 0.2 wt % MCNF film, the SAXS image showed a very strong cross pattern (which was very different from the 4-point pattern seen in FIG. 7), superimposed by a weak equatorial streak scattering pattern. In the 5 wt % MCNF film, the SAXS image showed a composite pattern having strong contributions from both cross and equatorial streak features. The equatorial streak scattering can be attributed to two factors: (1) scattering from non-correlated fibrillar-like crystal structures; and (2) scattering from oriented but non-correlated MCNF. While not wishing to be bound by any theory, it is believed the second factor is the dominant one, which would explain the larger fraction of equatorial scattering in the 5 wt % MCNF film.

The cross pattern can be attributed to a tilted crystal superstructure containing polymer chains completely parallel to the stretching direction within the crystals (because the Herman's orientation factor was about 1). The tilted angle of this crystal superstructure assembly may be caused by the shearing motion during the tensile deformation process.

From the above, it can be seen that the nanocomposites of the present disclosure were tougher than untreated UHMWPE. Using the integrated area under the stress and strain curve of FIG. 5 to gauge the toughness of the film, the toughness values of the 0.2 wt % and 5 wt % MCNF films were about 16 and 14 times that of the pure UHMWPE film, and about 7 and 6 times that of the 0.2 wt % oxidized-CNF film, respectively. This observation was indicative of the super-tough performance of the MCNF/UHMWPE nanocomposite.

While one would expect that the modulus of the nanocomposite should increase when compared to the neat resin, this was unexpectedly not seen. The similar moduli for UHMWPE and MCNF/UHMWPE films indicated that the addition of MCNF in UHMWPE did not exhibit a typical filler effect because the modulus of MCNF was about 600 GPa, which is higher than that of polyethylene extended chain crystals (240~340 GPa). Thus, the substantial improvement of the toughness in the MCNF/UHMWPE films cannot be explained by conventional stress field theories for the filled polymers based on stress-field overlap and/or transitions of the stress state developed for filled polymers.

The brittleness seen with the pressed UHMWPE film can be attributed to the low elongation-to-break ratio. The hot-press process at 180° C., which occurred at about 40° C. above the equilibrium melting temperature of polyethylene, generated a great deal of chain entanglements, which severely hindered the draw ability of the final sample at room temperature. This was consistent with the DSC data shown above in Table 1, where the crystallinity (Xc) of the pressed sample (~54%) was much lower than that of the as-polymerized sample (~80%). This result is not surprising since the high chain entanglements in the melt-processed UHMWPE could suppress the crystallization process and result in lower crystallinity.

The above would indicate that should the chain entanglement density further increase, it could lead to a lower elongation-to-break ratio. However, in the MCNF/UHMWPE samples, the crystallinity was unexpectedly found to be even lower (41% for the 0.2 wt % MCNF sample and 38% for the 5 wt % MCNF sample), indicating that the chain entanglement density was not decreased in the nanocomposites. Therefore, the much improved elongation-to-break ratio in the MCNF/UHMWPE nanocomposites was due to some other factors that overcame the barrier of high entanglement in UHMWPE.

At the initial stretching stage, the total crystallinity in the 5 wt % MCNF film decreased at a much slower rate than that in the 0.2 wt %/film (see Table 3). This indicated that the processes of crystal destruction (via chain pull-out) and reformation (or martensitic transformation) in the 5 wt % sample were retarded, due to the greater extent of the interfacial flow under stretching. As the initial nanocomposite samples were randomly oriented, the stretching deformation induced the following processes: (1) reorientation of MCNF and PE crystals; and (2) destruction and reformation of PE crystals. The high extent of interfacial flow around the MCNF greatly facilitated the plastic flow behavior of the 5 wt % sample at the initial deformation process, but the high concentration of MCNF also hindered the total extension of the sample, which was expected from the typical filler effect due to the particulate interactions.

In contrast, a small addition of MCNF (0.2 wt %) to UHMWPE simultaneously improved the elongation-to-break ratio (>10 times increase—from 50 to 500%) and the tensile strength (about 2 times increase), which was completely unexpected.

Figure 12:
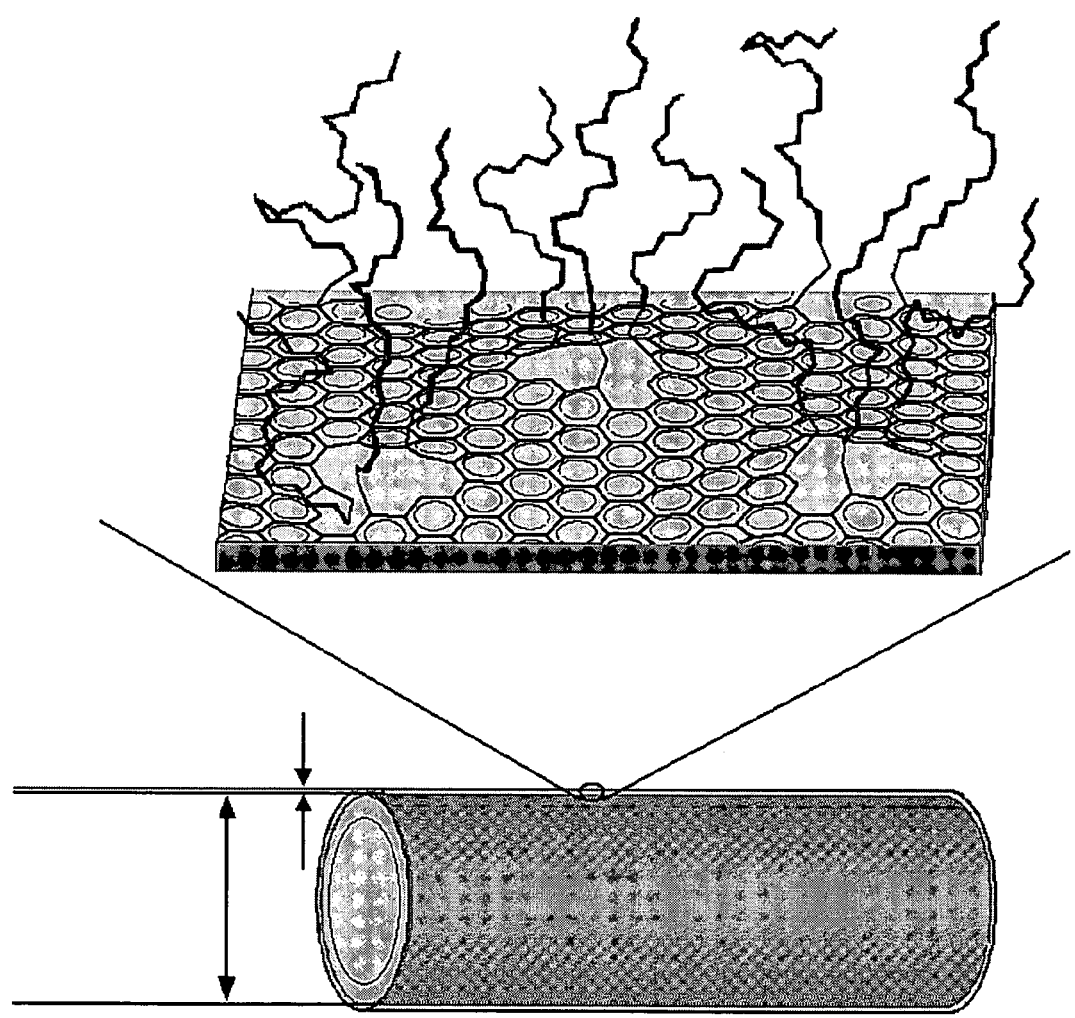
FIG. 12 is a scheme diagram of the interface in MCNF having a layer of oligomeric hydrocarbon chains.

The toughness enhancement in the MCNF/UHMWPE nanocomposite films was very significant at room temperature and was also notable at 118° C. While not wishing to be bound by any theory, it is believed the unexpected large elongation-to-break ratio (>500% at room temperature) was mainly due to the unique feature of MCNF, where a dense layer of short hydrocarbon chains (n=18) was present on the fiber surface (as graphically depicted in FIG. 12). As these short chains can act as solvent molecules and swell the surrounding polyethylene long chains, a high degree of chain mobility on the MCNF/UHMWPE interface existed. It is conceivable that a gel state of UHMWPE/$C_{18}$ was formed on the surface of MCNF, where the range of UHMWPE concentration was estimated as follows. As the maximum length of the octadecyl group (n=18) on the MCNF surface is about 16 Å (i.e. in the extended crystalline state, which is unlikely), the maximum density of the octadecyl layer is around 60% (assuming the outer diameter of CNF~100 nm, and the inner hole diameter of CNF~80 nm, the density of the carbon layer in CNF~2.1 g/cm$^3$, and about every 400 carbon atom had one octadecylamide chain attachment). Thus, the UHMWPE concentration range in the gel state of UHMWPE/$C_{18}$ at the MCNF interface was between 0-40 wt %, representing the two limiting UHMWPE concentration values on the MCNF surface. As the CNF and the attached $C_{18}$ chains were incompatible, the real UHMWPE concentration at the MCNF/UHMWPE interface was closer to 40 wt %.

From the above, it can be seen that at low strains the mobile interface did not notably affect the overall mechanical properties, but at high strains, the mobile UHMWPE chains at the MCNF interface overcame the barrier of chain entanglement in the UHMWPE matrix and induced plastic flow on a macroscopic scale. The interfacial flow in the vicinity of MCNF oriented the alignment of MCNF and caused polymer chain extension, resulting in a significant increase in the elongationto-break ratio, as well as the strain hardening behavior in the nanocomposites (see FIG. 6 and FIG. 10). At high strains, the mechanical properties of the 0.2 wt % MCNF film were superior to that of the 5 wt % MCNF film. This behavior can be explained by the filler interactions at higher concentrations, which hindered the extension of polymer chains near the interface.

In summary, the surface modification of carbon nanofiber with octadecylamide groups (short hydrocarbon chains with n=18) significantly facilitated the dispersion of MCNF in UHMWPE during melt processing. The nanocomposite film having only a small amount of MCNF (e.g. 0.2 wt %) showed a significant improvement on the elongation-to-break ratio and thus the toughness. The MCNF/UHMWPE thus represents a new type of nanocomposite with super-tough performance. The use of unmodified CNF did not show the significant improvement on the toughness. The super-tough performance of the MCNF/UHMWPE nanocomposite film was due to the plastic flow, induced by the interfacial flow of the UHMWPE chain probably in a gel-like form (the attached octadecylamide groups act as solvent molecules to UHMWPE) that can overcome the typical entanglement problem (thus the brittleness) of solid UHMWPE near the vicinity of MCNF. In-situ synchrotron WAXD showed that although the increase in MCNF content induced a higher degree of plastic flow, but the increase in filler interactions decreased the elongation-to-break ratio. The optimal toughness improvement occurred at a very low fraction of MCNF incorporation in UHMWPE.

The above examples demonstrate the surface modification of the carbon nanofibers to produce the MCNF of the present disclosure and nanocomposites based on MCNF and ultra-high molecular weight polyethylene (UHMWPE). The melt-press MCNF/UHMWPE films exhibited super-tough performance, while the neat UHMWPE films processed under the same conditions were extremely brittle. The MCNF of the present disclosure thus introduced two unique features to improve the toughness of the UHMWPE matrix: (1) the surface-grafted long hydrocarbon chains, which acted as solvent molecules to UHMWPE, greatly enhanced the dispersion of MCNF in UHMWPE during melt processing; and (2) the swollen polymer chains at the MCNF/UHMWPE interface induced a plastic flow behavior during deformation, significantly improving the elongation-to-break ratio (draw ability) of the nanocomposite. Contrary to the SWNT/PVA nanocomposite fibers prepared by Dalton et al. supra, where SWNT was the dominant phase (~60 wt %) and the role of PVA was mainly a 'glue', the amount of MCNF in UHMWPE was exceedingly low (the maximum loading percentage of MCNF was 10 wt %, with the role of MCNF being mainly a toughness enhancing agent.

While the above description contains many specific details of methods in accordance with this disclosure, these specific details should not be construed as limitations on the scope of the disclosure, but merely as exemplifications of preferred embodiments thereof. Those skilled in the art will envision many other possible variations that all within the scope and spirit of the disclosure.

What is claimed is:

1. A nanocomposite comprising:
    about 70 wt % to about 99.99 wt % of at least one polyolefin; and
    about 0.01 wt % to about 30 wt % of at least one modified carbon nanotube, wherein the modified carbon nanotube has been functionalized with at least one modifier comprising an alkene.

2. A nanocomposite as in claim 1 wherein the carbon nanotube comprises a single-wall nanotube.

3. A nanocomposite as in claim 1 wherein the carbon nanotube comprises a multi-wall nanotube.

4. A nanocomposite as in claim 1 wherein the carbon nanotube comprises a carbon nanofiber.

5. A nanocomposite as in claim 1 wherein the at least one modifier is an alkene selected from the group consisting of isoprene, butadiene, isobutadiene, and mixtures thereof.

6. A nanocomposite as in claim 1 wherein the modifier comprises isoprene.

7. A nanocomposite as in claim 1 wherein the polyolefin is selected from the group consisting of polyethylenes, polypropylenes, ethylene-propylene copolymers, ultra-high molecular weight polyethylenes, high pressure low density polyethylenes, linear low density polyethylenes, linear medium density polyethylenes, high density polyethylenes, and modified polyethylenes.

8. A nanocomposite as in claim 1 wherein the polyolefin comprises an ultra-high molecular weight polyethylene.

9. A fiber comprising the nanocomposite of claim 1.

10. A film comprising the nanocomposite of claim 1.

11. A nanocomposite comprising:
    about 70 wt % to about 99.99 wt % of at least one polyolefin; and
    about 0.01 wt % to about 30 wt % of at least one modified carbon nanotube, wherein the modified carbon nanotube has been functionalized with at least one modifier comprising an alkene selected from the group consisting of isoprene, butadiene, isobutadiene, and mixtures thereof.

12. A nanocomposite as in claim 11 wherein the carbon nanotube comprises a single-wall nanotube.

13. A nanocomposite as in claim 11 wherein the carbon nanotube comprises a multi-wall nanotube.

14. A nanocomposite as in claim 11 wherein the carbon nanotube comprises a carbon nanofiber.

15. A nanocomposite as in claim 11 wherein the modifier comprises isoprene.

16. A nanocomposite as in claim 11 wherein the polyolefin is selected from the group consisting of polyethylenes, polypropylenes, ethylene-propylene copolymers, ultra-high molecular weight polyethylenes, high pressure low density polyethylenes, linear low density polyethylenes, linear medium density polyethylenes, high density polyethylenes, and modified polyethylenes.

17. A nanocomposite as in claim 11 wherein the polyolefin comprises an ultra-high molecular weight polyethylene.

18. A fiber comprising the nanocomposite of claim 11.

19. A film comprising the nanocomposite of claim 11.

* * * * *

UNITED STATES PATENT AND TRADEMARK OFFICE
CERTIFICATE OF CORRECTION

PATENT NO. : 7,652,084 B2  Page 1 of 1
APPLICATION NO. : 10/570553
DATED : January 26, 2010
INVENTOR(S) : Chu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 853 days.

Signed and Sealed this

Twenty-third Day of November, 2010

David J. Kappos
*Director of the United States Patent and Trademark Office*